United States Patent [19]

Casuga et al.

[11] 4,190,198
[45] Feb. 26, 1980

[54] OIL COOLER BYPASS VALVE ACTUATING MEANS

[75] Inventors: Dennis W. Casuga, Pico Rivera; William C. Hauser, Hacienda Heights, both of Calif.

[73] Assignee: Lockhart Industries, Inc., Paramount, Calif.

[21] Appl. No.: 895,792

[22] Filed: Apr. 12, 1978

[51] Int. Cl.² .............................................. F01P 7/02
[52] U.S. Cl. ................................. 236/34.5; 236/93 A; 251/80
[58] Field of Search .................. 236/34.5, 93 A, 99 J; 165/35; 251/80

[56] References Cited

U.S. PATENT DOCUMENTS

| 2,396,138 | 3/1946  | Vernet    | 236/93 A X |
| 2,444,711 | 7/1948  | Shaw      | 236/34.5   |
| 2,795,381 | 6/1957  | Eskin     | 236/93 A   |
| 2,830,767 | 4/1958  | Herbenar  | 236/34.5 X |
| 2,837,285 | 6/1958  | Urban     | 236/34.5   |
| 3,300,135 | 1/1967  | Slater et al. | 236/34.5 |
| 3,404,837 | 10/1968 | James     | 236/34.5   |
| 3,506,192 | 4/1970  | Otto      | 236/34.5   |

Primary Examiner—William E. Wayner
Assistant Examiner—William E. Tapolcai, Jr.
Attorney, Agent, or Firm—Fulwider, Patton, Rieber, Lee & Utecht

[57] ABSTRACT

A valve actuating mechanism for an oil cooler bypass valve of the type in which a thermally responsive element expands to urge a valve member against a valve seat and thereby cause oil to flow through an oil cooler. A valve member is utilized which is movable independently of the thermally responsive element, and a relief spring is interposed between the valve member and the thermally responsive element to transmit expansion of the element to the valve member. The valve actuating mechanism is designed to allow oil to pass through the valve despite incorrect connections between the ports of the bypass valve and the ports of the oil cooler and oil source. In one embodiment in which the valve member comes into engagement with a valve seat, the relief spring is adapted to accommodate expansion of the element subsequent such seating whereby damage to the bypass valve components is avoided.

7 Claims, 5 Drawing Figures

OIL COOLER BYPASS VALVE ACTUATING MEANS

BACKROUND OF THE INVENTION 1. Field of the Invention

The present invention relates to oil cooler bypass valve actuating means, and more particularly to actuating means of the type utilizing a thermally responsive element to effect valve actuation.

2. Description of the Prior Art

An oil cooler bypass valve is used in conjunction with an engine or an oil transmission or the like and is designed to provide a flow path by which oil passing to the valve from the engine is returned during warm-up periods. In a typical application oil at a temperature less than 160° F. is routed back to the engine. At temperatures between 160° F. and 180° F. a valve member permits some of the engine oil to pass to a cooler, and the balance is returned to the engine. At temperatures above 180° F. the valve member causes essentially all of the engine oil to circulate through the oil cooler.

In most prior art systems, such as that described, for example, in U.S. Pat. No. 4,027,643 issued June 7, 1977 and entitled "Oil Cooler Control," the valve member is an integral part of a thermally responsive element which expands to cause the valve member to engage the valve seat. Once seated such a valve member is susceptible to at least two malfunctions. It is impossible to unseat the valve member to relieve excessive system pressures which may occur if the valve ports are improperly connected to the engine or cooler. Secondly, the components of the bypass valve are often damaged when the thermally responsive element continues to expand, which sometimes occurs when the cooler is overloaded and the oil heats excessively. Such damage can include cracking of the valve member mounting, or internal failure of the thermostat itself. In either case the bypass valve is unfit for further service.

SUMMARY OF THE INVENTION

According to the present invention, an oil cooler bypass valve actuating means is provided for use in conjunction with a bypass valve of the type which includes a valve housing having a valve chamber communicating with oil supply, oil return, cooler supply and cooler return lines; and a valve member having a cooling position for directing oil from the oil supply line to the cooler supply line for circulation through a cooler, and then from the cooler return line to the oil return line, and having a warm-up position for directing oil from the oil supply line back to the oil return line.

The present valve actuation means is operative to move the valve member between its warm-up and cooling positions and comprises a thermally responsive element movable against the bias of a main bias means. The thermally responsive element is not integral with the valve member, but against it, through a relief bias means. Further, since the valve member is acted upon on opposite sides by the main bias means and the relief bias means, respectively, either of these bias means can be overriden under certain circumstances to relieve excessive system pressures which might otherwise occur if the valve ports were improperly connected to the engine or cooler. In one embodiment of the invention in which the valve member is seated against a valve seat in its cooling position, further expansion of the thermally responsive element can occur without damage to the bypass valve components since the expansion is accommodated by compression of the relief bias means.

Other objects and features of the invention will become apparent from consideration of the following description taken in connection with the accompanying drawings.

DESCRIPTION OF THE PREFERRED EMBODIMENTS

Figure 2:
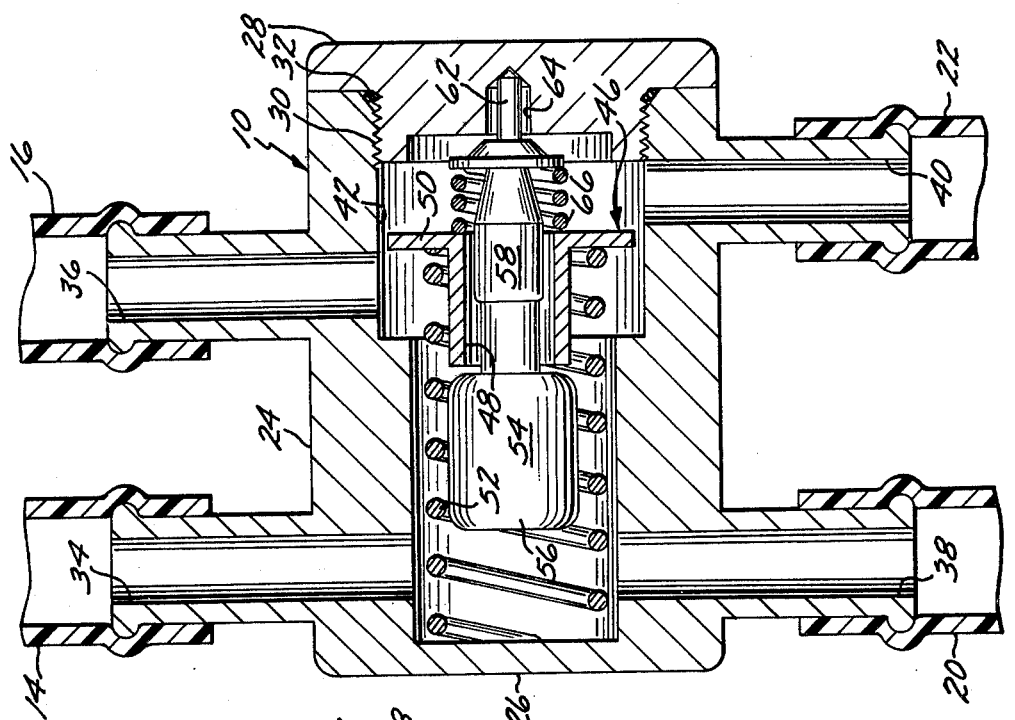
FIG. 2 is an enlarged longitudinal cross-sectional view of the valve of FIG. 1 and illustrating the valve actuating means of the present invention in its cooling position.

Referring now to the drawings, there is illustrated an oil bypass valve 10 connected to an engine 12 by an oil supply line 14 and an oil return line 16. The valve 10 is also connected to an oil cooler 18 by a cooler supply line 20 and a cooler return line 22.

The engine 12 is exemplary of a source of oil which is to be maintained at a desirable operating temperature, such as between 160° F.–180° F. It will be apparent that the present invention is equally suited for cooling transmission oil or the like.

Details of the cooler 18 are omitted for brevity since suitable coolers for cooling oil are well known in the art. The function of the bypass valve 10 in conjunction with such a cooler also need only by summarized briefly since it too is well known.

As previously indicated in the description of the prior art, the purpose of the bypass valve 10 is to receive engine oil from the engine 12 by means of the line 14 and return the oil through the line 16 during warm-up periods, such as when the oil is at a temperature of 160° F. or less, for example. When the engine oil temperature exceeds 160° F. at least a portion of the oil is directed by the valve 10 to the cooler 18 by means of the line 20. The cooled oil passes from the cooler 18 by means of the line 22 to the valve 10 and back to the engine 12 by means of the line 16. At temperatures above 180° F. essentially all of the oil is routed through the cooler 18. It should be understood that these temperatures are merely exemplary and are not critical operating limits.

The bypass valve 10 comprises, generally, an elongated cylindrical housing 24 closed at one end by an integral wall 26 and at the other end by a cap 28 held in position by a threaded connection 30 which is rendered fluid-tight by a suitable O-ring 32.

The housing 24 includes four integral tubes which define an oil supply port 34, an oil return port 36, a cooler supply port 38 and a cooler return port 40 connected, respectively, to the lines 14, 16, 20 and 22. If desired, the ports 34 and 38 could be combined into a single port )not shown) for suitable connection to the lines 14 and 20.

The housing 24 further includes an elongated cylindrical valve chamber 42 having a portion adjacent the wall 26, and a larger diameter counterbore portion adjacent the cap 28, the different diameter portions defining an annular shoulder or valve seat 44. All of the ports 34, 36, 38 and 40 are in communication with the valve chamber 43, the ports 34 and 38 being aligned and oppositely located and opening into the smaller diameter portion of the chamber 42. The ports 36 and 40 are oppositely located, open into the larger diameter portion of the chamber 42, but are not aligned, being offset a distance slightly more than the diamater of the port 36, and for a purpose which will be described later.

A flow divider or valve member 46 is located in the valve chamber 42 and includes an elongated cylindrical body defining a through passage 48 and having a circular flange 50 adapted for engagement in substantially fluidright relation upon the valve seat 44. This seated position of the valve member 46 constitutes the "cooling position" of the valve member 46, in which substantially all of the engine oil is constrained to flow from the valve chamber 42 into the oil cooler 18 through the cooler supply port 38, and substantially all of the oil from the cooler 18 is constrained to flow from the cooler 18 into the chamber 42 and back to the engine 12 through the oil return port 36.

Figure 3:
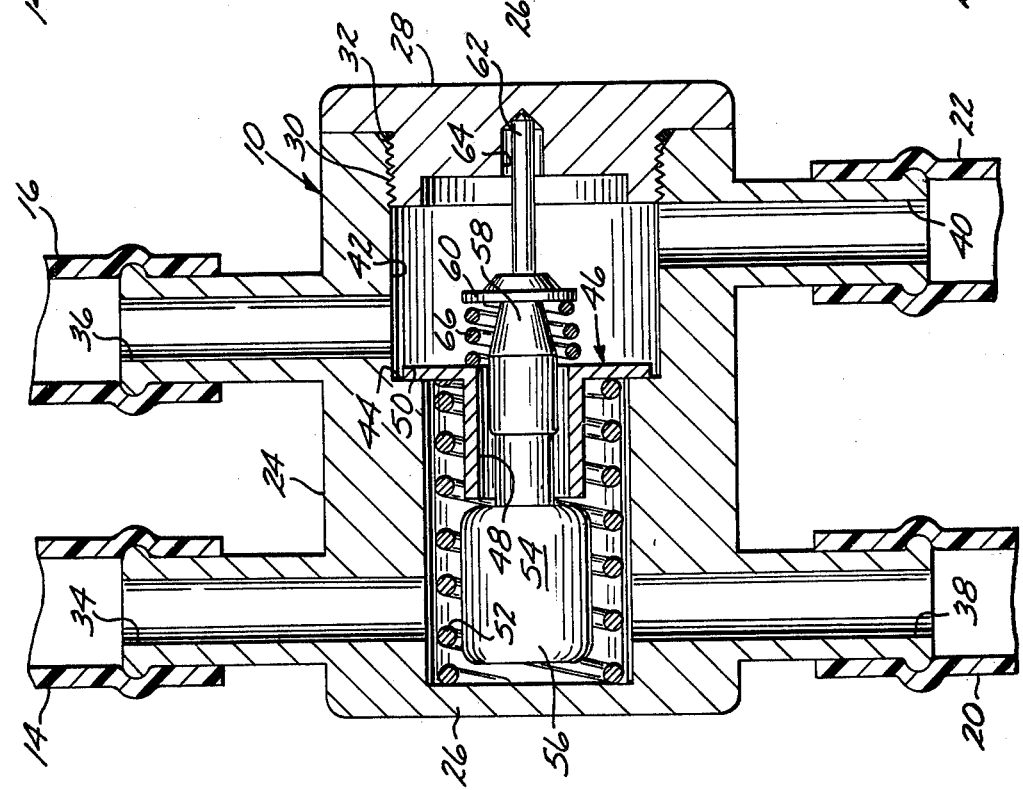
FIG. 3 is a view similar to FIG. 2 but illustrating the valve actuating means in its cooling position.
Figure 1:
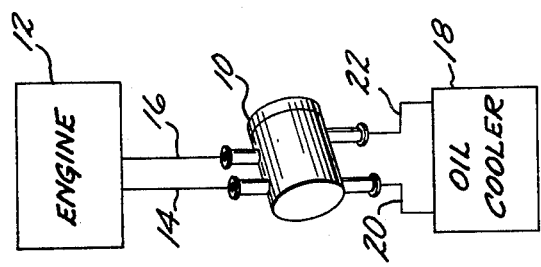
FIG. 1 is a perspective view of an oil cooler bypass valve, diagrammatically illustrating its connection to an engine and an oil cooler.

The present valve actuating means for operating the valve member 46 includes a main bias means or compression spring 52 which normally urges the valve member 46 away from the cooling position of FIG. 2 toward a location remote from the valve seat 44. This position is illustrated in FIG. 3 and constitutes the "warm-up position" of the valve member 46. One end of the spring 52 bears against the valve housing wall 26 and the opposite end of the spring 52 bears against the adjacent face of the valve member flange 50. The spring 52, valve member passage 48 and valve chamber 42 are generally coaxial, the diameter of the coils of the spring 52 being such that there is ample space for spring extension and retraction relative to the walls of the chamber 42, and relative to the cylindrical postion of the valve member 46 encompassed by the spring coils.

In the warm-up position of FIG. 3 substantially all of the engine oil entering the valve chamber 42 from the oil supply port 34 flows through the annular space between the valve member 46 and the walls of the chamber to the oil return port 36. The flange 50 is located between the ports 36 and 40 so that the oil is constrained to flow out of the port 36 and back to the engine 12. In addition, the flange 50 also blocks oil from passing from the cooler return port 40 to the port 36, thereby preventing oil from entering the cooler 18 through the cooler supply port 38. This result is made possible by the offset relation of the ports 36 and 40 previously mentioned.

A thermostat 54 is located in the valve chamber 42 and is responsive to an increase in temperature of the oil in the chamber 42 to move the valve member 46 from the warm-up position of FIG. 3 to the cooling position of FIG. 2.

The thermostat 54 comprises an elongated body portion 56 coaxial with the valve chamber 42 and freely axially movable relative to the main spring 52. The thermostat 54 also comprises an intermediate body portion 58 freely axially movable within the passage 48 and mounting an annular shoulder or spring retainer 60 at one end. An extensible element or pin 62 is movable in and out of the thermostat body portion 58 and its free end is received within a blind bore 64 provided in the housing cap 28.

A thermally responsive compound (not shown) located within the body portion 56 expands with a rise in temperature, urging the pin 62 axially outwardly, and thereby causing the spring retainer 60 to move from the position in FIG. 3 to that of FIG. 2. Such a thermally responsive compound in a thermostat 54 of the type described is well known in the prior art. Specific details of the thermostat 54 will therefore be omitted for brevity. Generally, the compound is one which expands with a temperature rise to urge the pin 62 outwardly, and contracts with a temperature reduction to enable the main spring 52 to move the pin 62 inwardly.

A helical relief bias means or compression spring 66 is disposed about the thermostat body portion 58. Its opposite ends engage the spring retainer 60 and the adjacent face of the valve member flange 50. The spring rate of the spring 66 is greater than that of the spring 52. Thus, any movement of the spring retainer 60 to the left, as viewed in FIGS. 2 and 3, causes the valve member 46 also to move to the left for eventual seating upon the valve seat 44.

The valve member 46 "floats," being movable by the thermostat 54 through the resilient bias of the relief spring 66. Consequently, once the valve member 46 is seated upon the valve seat 44, if axial outward movement of the pin 62 continues to occur, such as during overheating of the oil in the valve chamber 42, the relief spring 66 yields and thereby prevents cracking or other damage to bypass valve components.

The warm-up position of FIG. 3 exists at temperatures below approximately 160° F. In this position, oil from the engine 12 enters the oil supply port 34, passes through the valve chamber 42, and then returns to the engine 12 via the oil return port 36.

In the cooling position of FIG. 2, which exists at an oil temperature of approximately 180° F., the flange 50 is seated upon the valve seat 44. Oil from the engine 12 enters through the oil supply port 34, passes through the cooler 18, and then is returned through ports 40 and 36 to the engine 12. Engine bypass flow from port 34 to port 36 is blocked by the seated flange 50 so that all the oil goes through the cooler.

At temperatures above 180° F. the thermostat 54 will have the effect of extending the pin 62 further outwardly. However, as previously indicated, such extension is accommodated by compression of the relief spring 66. The relief spring 66 is designed to accommodate extension of the pin 62 for oil temperatures up to 300° F., which is far in excess of normal oil operating temperatures.

The "floating" characteristic of the valve member 46 not only protects the valve components against damage from overextension of the pin 62, but also prevents excessive pressure drops across the flange 50 which might otherwise be caused by incorrect connection of the lines 14, 16, 20 and 22 to the bypass valve 10. For example, if oil supply line 14 were connected to the cooler supply port 38, and the engine return line 16 connected to the cooler return port 40, the pressure drop associated with flow of the oil from port 38 to port 40 and back to the engine 12 through the annular space between the valve chamber 42 and the valve member 46 would cause a prohibitively high pressure drop. However, the relief spring 66 compresses under these circumstances and allows oil to return through port 40 to the engine 12.

Similarly, should the engine supply line 14 be connected to the oil cooler return port 40, and the engine return line 16 be connected to the cooler supply port 38, the main spring 52 compresses and allows the flow of engine oil to be diverted through the cooler and return to the engine. Thus, the resilience of the springs 52 or 66, as the case may be, allows them to be compressed to open up paths of flow to and from the engine for various types of improper connections.

The valve member 46 is operative to modulate return flow of oil to the engine 12 and flow of oil to the cooler 18 in the temperature range between 160° F. and 180° F. Thus, as the flange 50 moves to the left upon extension of the pin 62, the flange 50 moves across the port 36 and opens dual oil flow paths. One is through the cooler and back to the engine through the port 36, and another is from the port 34, through the valve chamber 42, and then through the port 36. Such modulation enables more precise control of oil cooling.

Figure 4:
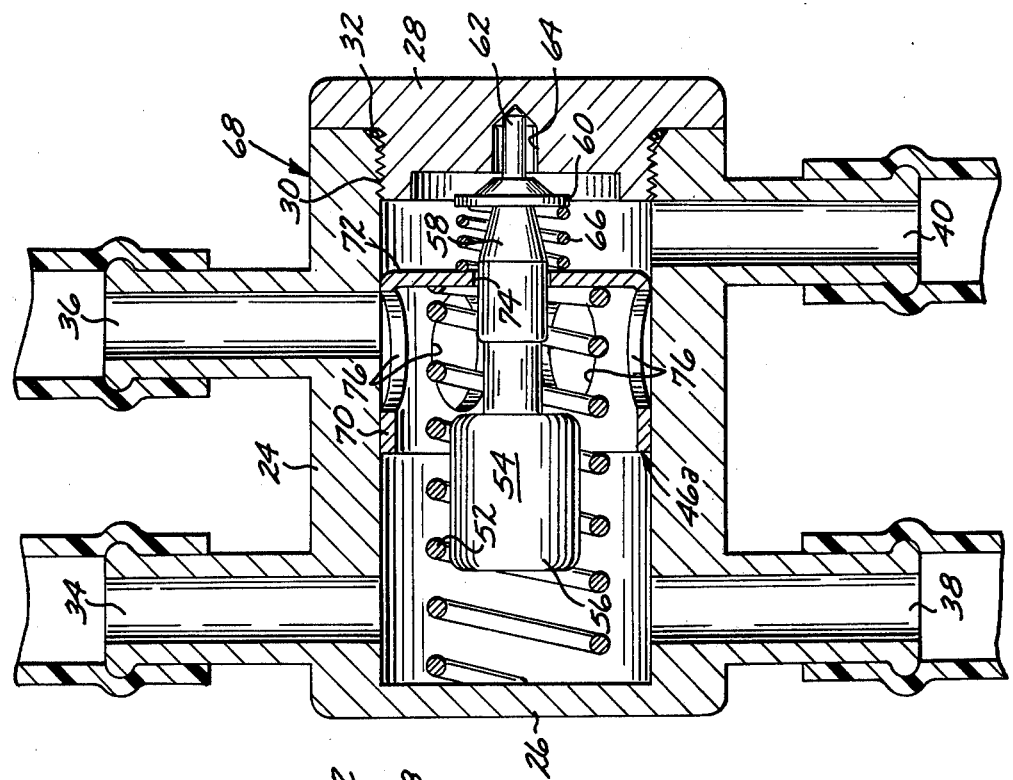
FIG. 4 is a longitudinal cross-sectional view of a second embodiment of the present invention, illustrating the components in a cooling position.
Figure 5:
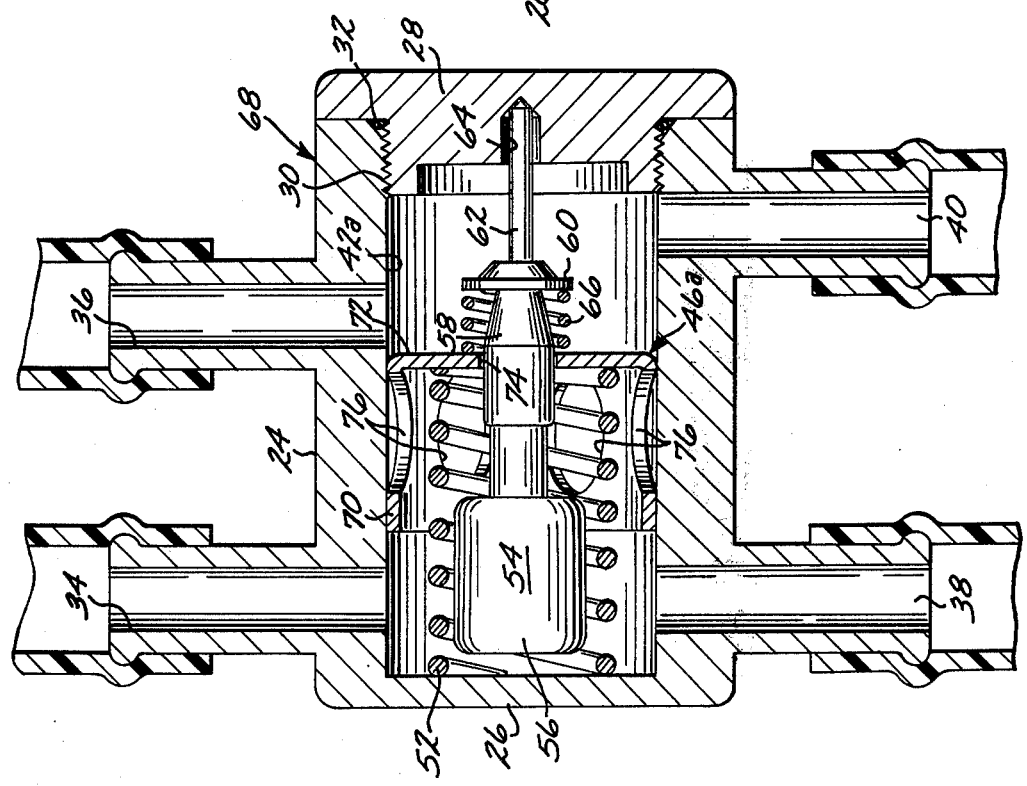
FIG. 5 is a view similar to FIG. 4, but illustrating the components in a warm-up position.

Referring now to FIGS. 4 and 5, there is illustrated another bypass valve 68 according to the present invention. The components and operation of the valve 68 are substantially the same as that of the bypass valve 10. Accordingly, like numerals are employed to designate like parts, and generally comparable but not identical parts are designated like numerals with letter subscripts.

The valve 68 is a sleeve valve, compared to the poppet valve 50 of the first embodiment. However, it utilizes the same oppositely acting springs 52 and 66, which also have the same function of preventing excessive pressure across the valve member, which might otherwise occur when the ports of the valve are incorrectly connected to the engine 12 and cooler 18, as will be seen.

The valve 68 includes a cylindrical valve member 46a having a skirt 70 which is longitudinally slidable within the elongated valve chamber 42a. The chamber 42a has a uniform transverse cross section so that the valve member 46a is slidable between the cooling position of FIG. 4 and the warm-up position of FIG. 5.

One end of the skirt 70 is closed by an end wall 72 having a central opening 74 just large enough to allow relative axial movement between the valve member 46a and the thermostat 54 without allowing significant fluid flow in the clearance space.

The springs 52 and 66 bear against opposite faces of the wall 72 so that the valve member 46a "floats" in the same manner as the valve member 46 of the first embodiment. Excessive pressure drops across the valve member wall 72 cannot occur because one or the other of the springs compresses to allow movement of the valve member 46a in a direction such that fluid from the high pressure zone can escape through one of the valve ports.

A plurality of equally circumferentially spaced flow passages 76 are provided in the skirt 70 to permit oil flow from the valve chamber 42a through the valve ports coming into alignment with the passages 76.

In the cooling position of FIG. 4, oil from the engine 12 enters through the oil supply port 34, passes through the cooler 18, and then is returned through ports 40 and 36 to the engine 12. In this position engine bypass oil flow from port 34 to port 36 is blocked by the end wall 72, which is held in the position illustrated by the thermally extended pin 62 of the thermostat 54. Further extension of the pin 62 cannot damage any components of the valve 68 since such extension only results in slight further movement of the valve member 46a to the left, as viewed in FIG. 4.

In the warm-up position of FIG. 5, oil from the engine 12 enters the oil supply port 34, passes through the valve chamber 42a to the interior of the valve member 46a, and then through passages 76 to the engine 12 via the oil return port 36.

Valve member 46a, like valve member 46 of the first embodiment, is operative to modulate return flow of oil to the engine 12 and through the cooler 18 in positions intermediate its cooling and warm-up positions. For example, as the end wall 72a moves to the left upon extension of the pin 62, it moves across the port 36 and opens dual oil flow paths. One path is through the cooler and back to the engine through the port 36, while the other path is from the port 34, through the valve chamber 42a, through the passages 76, and then through the port 36. This type of modulation makes it possible to more precisely control the degree of oil cooling.

Various modifications and changes may be made with regard to the foregoing detailed description without departing from the spirit of the invention.

I claim:

1. In an oil cooler bypass valve including a valve housing having an elongated valve chamber communicating with oil supply, oil return, cooler supply and cooler return lines; and a valve member having a cooling position for directing oil from the oil supply line to the cooler supply line for circulation through a cooler and from the cooler return line to the oil return line, and further having a warm-up position for directing oil from the oil supply line back to the oil return line, an improved valve actuating means for moving the valve member between the warm-up and cooling positions, said valve actuating means comprising:

a main spring engaged between said valve housing and said valve member and operative to urge said valve member toward said warm-up position;

a thermostat having a main portion and a pin extensible from said main portion in response to an increase in the temperature of oil in said valve chamber, said pin being engaged upon said valve housing;

a relief spring engaged between said valve member and said main portion for moving said valve member toward said cooling position upon extension of said pin relative to said main portion, said main spring being compressible to enable movement of said valve member in one direction under the influence of relatively high pressure acting on one side of said valve member, said relief spring being compressible to enable movement of said valve member in the opposite direction under the influence of relatively high pressures acting on the other side of said valve member.

2. An improved valve actuating means according to claim 1 wherein said valve housing includes a valve seat engageable by said valve member in said cooling position, and wherein said relief spring is compressible upon any continued extension of said thermostat pin subsequent engagement of said valve seat by said valve member.

3. An improved valve actuating means according to claim 1 wherein said valve member comprises a cylindrical skirt longitudinally slidable in said valve chamber and having a centrally apertured end wall engaged on opposite sides by said main spring and said relief spring, said main portion being freely movable through the aperture in said end wall, said skirt including circumferentially arranged oil flow passages providing communication between said oil supply and oil return lines in said warm-up position.

4. An improved valve actuating means according to claim 1 wherein the spring rate of said relief spring is greater than the spring rate of said main spring.

5. An improved valve actuating means according to claim 1 wherein said valve member comprises a body having a portion adapted for sealing engagement upon a valve seat, said relief spring being compressible upon any continuation of said extension of said pin subsequent said sealing engagement.

6. An improved valve actuating means according to claim 5 wherein said portion in said warm-up position is located between openings in said valve housing in communication with said cooler return line and said engine return line to block oil flow therebetween.

7. An improved valve actuating means according to claim 6 wherein said portion in positions between said warm-up and cooling positions allows oil to flow from both said engine supply and cooler return lines into said oil return line.

* * * * *